United States Patent
Sahs et al.

(10) Patent No.: US 8,381,401 B2
(45) Date of Patent: Feb. 26, 2013

(54) METHOD OF INSTALLING ROTATABLE FLAPPER VALVE TO AN INTERIOR OF A CONDUIT

(75) Inventors: Jordan Sahs, Grass Lake, MI (US); Jason Lefler, Brooklyn, MI (US); William E. Hill, Ann Arbor, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 979 days.

(21) Appl. No.: 12/424,783

(22) Filed: Apr. 16, 2009

(65) Prior Publication Data

US 2010/0263211 A1   Oct. 21, 2010

(51) Int. Cl.
   *F16K 51/00*   (2006.01)
(52) U.S. Cl. ............... 29/890.131; 29/421.1; 29/890.13; 29/890.132
(58) Field of Classification Search ............. 29/890.131, 29/890.122, 890.124, 890.126, 890.13, 890.132, 29/890.129, 421.1; 72/370.06
   See application file for complete search history.

(56) References Cited

U.S. PATENT DOCUMENTS

| | | | |
|---|---|---|---|
| 1,613,332 A | 1/1927 | Goetz | |
| 1,709,426 A | 4/1929 | Beery | |
| 1,832,090 A | 11/1931 | Branche | |
| 1,840,082 A | 1/1932 | Breer | |
| 1,860,892 A | 5/1932 | Gray | |
| 2,072,372 A | 3/1937 | Kingsley | |
| 2,157,030 A | 5/1939 | Starkweather | |
| 2,268,806 A | 1/1942 | Curtis | |
| 2,380,374 A | 7/1945 | Anderson | |
| 2,556,277 A | 6/1951 | Hill et al. | |
| 2,855,283 A | 10/1958 | Schumacher | |
| 2,986,373 A | 5/1961 | Masheder | |
| 3,020,980 A | 2/1962 | Baker et al. | |
| 3,406,783 A | 10/1968 | Haffer | |
| 3,633,598 A * | 1/1972 | Morris et al. | 137/15.17 |
| 3,703,937 A | 11/1972 | Tenney | |
| 4,264,344 A | 4/1981 | Ludecke et al. | |
| 4,356,801 A | 11/1982 | Graham | |
| 4,378,003 A | 3/1983 | Imamura | |
| 4,396,034 A | 8/1983 | Cherniak | |
| 4,541,506 A | 9/1985 | Venning et al. | |
| 4,563,605 A | 1/1986 | Gerber | |
| 4,565,176 A | 1/1986 | Alf et al. | |
| 4,653,725 A | 3/1987 | Nanz et al. | |
| 4,707,987 A | 11/1987 | Atkin | |

(Continued)

FOREIGN PATENT DOCUMENTS

| | | |
|---|---|---|
| DE | 1957058 | 5/1971 |
| DE | 3302159 | 7/1984 |

(Continued)

*Primary Examiner* — David Bryant
*Assistant Examiner* — Christopher Besler
(74) *Attorney, Agent, or Firm* — Harness, Dickey & Pierce, P.L.C.

(57) ABSTRACT

A method of assembly of a rotatable flapper valve to an interior of a conduit features the ability to couple the valve plate to its axle outside of the conduit in an independent operation. The conduit is split into first and second sections each having a flared end and a pair of indentations for receipt of the valve axle. While separated, the valve axle is placed in a pair of indentations in one of the conduit sections and then the second conduit section is moved into abutting engagement such that its indentations also partially surround the axle. The first and second conduit sections are then joined by welding.

12 Claims, 3 Drawing Sheets

U.S. PATENT DOCUMENTS

| | | |
|---|---|---|
| 4,805,571 A | 2/1989 | Humphrey |
| 4,825,983 A | 5/1989 | Nakanishi |
| 4,843,860 A * | 7/1989 | Gray .................................. 72/318 |
| 4,903,486 A | 2/1990 | Finkle |
| 4,944,325 A * | 7/1990 | Baldwin et al. ................ 137/375 |
| 5,022,135 A * | 6/1991 | Miller et al. .................. 29/421.1 |
| 5,044,396 A | 9/1991 | Daudet et al. |
| 5,355,673 A | 10/1994 | Sterling et al. |
| 5,392,812 A | 2/1995 | Herron |
| 5,581,056 A | 12/1996 | Bellgardt et al. |
| 5,633,482 A | 5/1997 | Erion et al. |
| 5,692,374 A | 12/1997 | Seki et al. |
| 5,723,829 A | 3/1998 | Inomata et al. |
| 5,739,483 A | 4/1998 | Yashiro et al. |
| 5,744,762 A | 4/1998 | Seki et al. |
| 5,749,335 A | 5/1998 | Flanery et al. |
| 5,813,380 A | 9/1998 | Takahashi et al. |
| 5,821,474 A | 10/1998 | Olszok et al. |
| 5,839,489 A | 11/1998 | Ganachaud et al. |
| 5,931,052 A | 8/1999 | Zhao et al. |
| 5,971,098 A | 10/1999 | Suzuki et al. |
| 5,971,859 A | 10/1999 | Runge et al. |
| 5,984,045 A | 11/1999 | Maeda et al. |
| 6,189,650 B1 | 2/2001 | Inuzuka et al. |
| 6,193,214 B1 | 2/2001 | Schatz |
| 6,332,442 B1 | 12/2001 | Komada et al. |
| 6,446,338 B1 * | 9/2002 | Wu .......................... 29/890.128 |
| 6,499,562 B1 | 12/2002 | Elfinger et al. |
| 6,527,006 B2 | 3/2003 | Jackson |
| 6,536,567 B2 | 3/2003 | Nakanishi |
| 6,553,963 B1 | 4/2003 | Noble |
| 6,564,902 B1 | 5/2003 | Saberi |
| 6,598,390 B2 | 7/2003 | Chang |
| 6,604,516 B1 | 8/2003 | Krimmer et al. |
| 6,637,545 B1 | 10/2003 | Jonsson et al. |
| 6,640,927 B1 | 11/2003 | Turner |
| 6,732,511 B2 | 5/2004 | Unbehaun et al. |
| 7,182,171 B2 | 2/2007 | Weinert et al. |
| 7,434,570 B2 | 10/2008 | Hill |
| 2004/0178015 A1 | 9/2004 | Wiemeler et al. |
| 2006/0272322 A1 | 12/2006 | Abram et al. |
| 2008/0223025 A1 | 9/2008 | Hill |
| 2008/0224083 A1 | 9/2008 | Hill |
| 2008/0245063 A1 | 10/2008 | Hill |
| 2009/0127023 A1 | 5/2009 | Abram et al. |

FOREIGN PATENT DOCUMENTS

| | | |
|---|---|---|
| DE | 19843560 | 3/2000 |
| DE | 20105380 | 8/2001 |
| EP | 0424197 | 4/1991 |
| EP | 1045180 | 10/2000 |
| GB | 1293665 | 10/1972 |
| JP | 3-160125 | 7/1991 |
| JP | 1997-303143 A | 11/1997 |
| JP | 1998-141041 A | 5/1998 |
| JP | 2000-002112 | 1/2000 |
| JP | 2002-235536 | 8/2002 |
| JP | 2006-322411 | 11/2006 |
| KR | 10-1998-0002656 A | 3/1998 |
| KR | 10-1998-0009780 A | 4/1998 |
| KR | 10-2001-0038902 A | 5/2001 |
| WO | WO2008-115212 | 9/2008 |

* cited by examiner

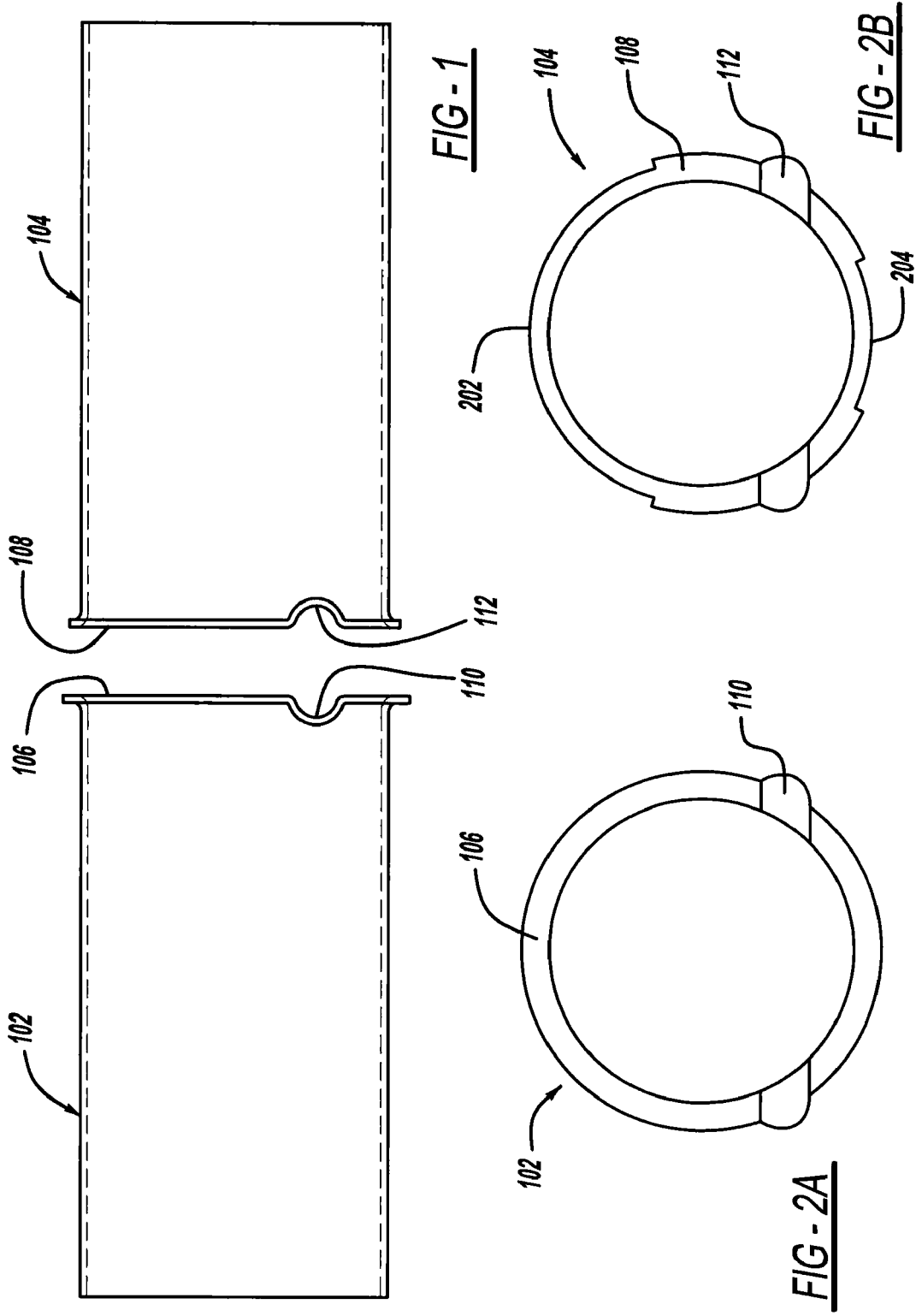

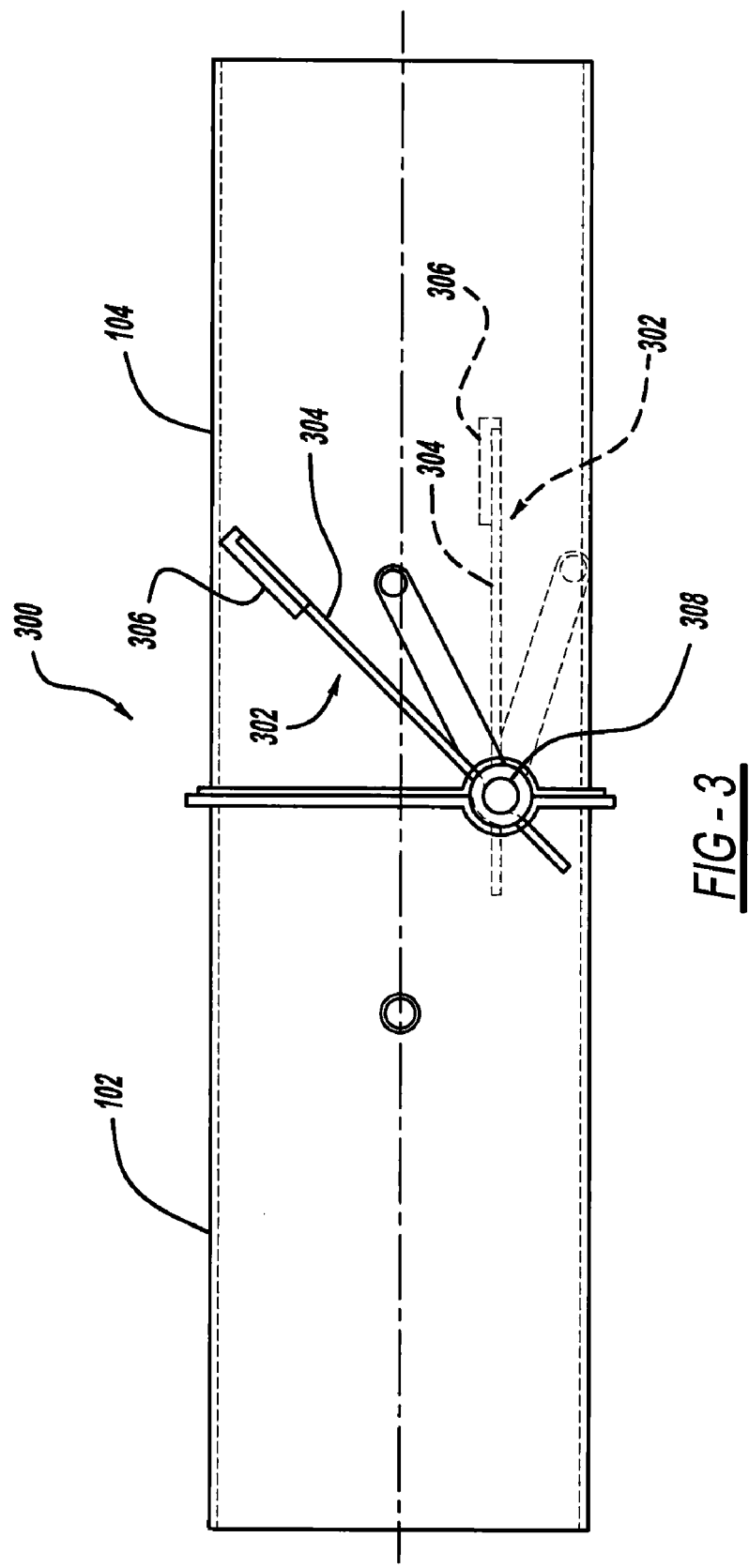

METHOD OF INSTALLING ROTATABLE FLAPPER VALVE TO AN INTERIOR OF A CONDUIT

FIELD

The present disclosure relates to installation of a rotatable flapper valve, such as a snap-action valve, to an interior of a conduit.

BACKGROUND

This section provides background information related to the present disclosure which is not necessarily prior art.

Many exhaust systems have attempted to use both active and passive valve assemblies to alter the characteristics of exhaust flow through a conduit as the exhaust pressure increases due to increasing engine speed. Active valves carry the increased expense of requiring a specific actuating element, such as a solenoid. Passive valves utilize the pressure of the exhaust stream in the conduit with which the valve is associated.

Traditionally, even passive valves at their lower expense give rise to assembly problems when utilized with a tubular conduit in which they are to be mounted.

In one approach, when assembling such a flapper valve or snap-action valve plate inside the conduit, the axle is first inserted through openings on opposite sides of the conduit and then the valve flap must be welded to the axle while it is inside the tube. This requires provision of at least one access opening to receive a welding tool. Furthermore, a simple one-piece conduit with drilled holes for the axle also leads to potential rattling between the axle shaft and the holes leading to undesirable operating noise.

Another approach to assembling a flapper valve to a conduit is to utilize two conduit halves which are initially separated and slotted with notches with match up with each other to form closed perimeter axle receiving holes after the axle and valve have been inserted into one pair of the notches. The advantage of this approach is that the flap/axle can be assembled outside of the conduit and notches can be easily produced. However, this is countered by the disadvantage that it may be difficult to control the hole size for receipt of the axle. Additionally, support for any bushings surrounding the axle is confined to a narrow area.

In yet another prior approach, notches for the axle in the two pipe halves can be cut out and the two pipes are flanged and butted together but not overlapped. This presents a positive stop and maintains a consistent hole size. However, support for any axle bushing is too narrow and will cause the bushings to wear out prematurely.

SUMMARY

This section provides a general summary of the disclosure, and is not a comprehensive disclosure of its full scope or all of its features.

In accordance with the present teachings, a method of assembly of a rotatable flapper valve to an interior of a conduit includes fastening a valve plate to a valve axle. First and second conduit sections are selected and indentations in the flared ends of the first and second conduit sections are formed. A valve axle is placed in the first and second indentations in the flared first end of the first conduit section. The flared first end of the second conduit section is placed in contact with the flared first end of the first conduit section such that the first and second indentations in the first flared end of the second conduit section are aligned with the first and second indentations of the flared first end of the first conduit section to partially surround the valve axle. The first flared end of the first conduit section is then fastened to the first flared end of the second conduit section.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The objects and features of the teachings herein will become apparent upon a reading of a detailed description, taken in conjunction with the drawing, in which:

FIG. 1 is a side plan view of two pipe sections arranged in accordance with the present teachings and shown prior to assembly to each other with a snap-action valve assembly installed;

FIG. 2A is an end plan view of pipe section 102 of FIG. 1 after flaring the end to 45° and then ram-forming an axle receiving indentation;

FIG. 2B is an end plan view of pipe section 104 of FIG. 1 after flaring the end to 45°, ram-forming an axle receiving indentation, and notching the flare above and below a center axis of the pipe;

FIG. 3 is a side cross-sectional view of an assembled conduit housing a snap-action valve in accordance with the present teachings.

Corresponding reference numerals indicate corresponding parts throughout the several views of the drawings.

DETAILED DESCRIPTION

Figure 4A:
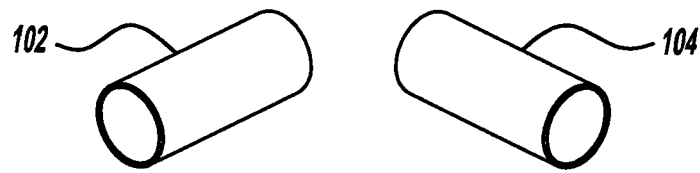
FIGS. 4A-4F show successive steps of a method of assembly of a snap-action valve assembly inside a conduit in accordance with the present teachings.
Figure 4B:
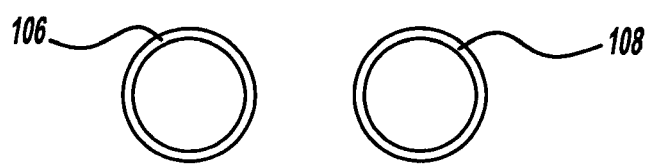

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, these elements should not be limited by these terms. These terms may be only used to distinguish one element from another. Terms such as "first," "second," and other numerical terms when used herein do not imply a sequence or order unless clearly indicated by the context. Thus, a first element discussed below could be termed a second element without departing from the teachings of the example embodiments.

With reference to FIGS. 1, 2A, 2B and 3, the principal components of an assemblage of a flapper valve such as a snap-action valve within the interior of a conduit are shown. Pipe sections 102 and 104 have flared ends with flares 106 for section 102 and 108 for section 104 facing each other. Formed in the flares of each pipe section is an axle receiving pair of indentations 110 for section 102 and 112 for section 104. To promote stronger welding of pipe section 102 to pipe section 104 after the valve assembly has been installed, notches 202 and 204 are cut out of flare 108 of pipe section 104 above and below a central axis of pipe section 104. Absent notches 202 and 204, it has been found that the only surface available for receipt of a weld is the top of the flange. Under this circumstance the weld may crack more easily. By forming notches 202 and 204, the weld is lower and actually constitutes a mid-weld which penetrates the material more satisfactorily.

The indentations 110, 112 are formed so as to align with each other whenever pipe sections 102 and 104 have their flared ends placed together in abutting relationship. The flared holes then formed house opposing ends of the valve axle.

The valve assembly 302 is shown installed in a conduit 300 in FIG. 3. Valve assembly 302 includes a valve plate or flapper 304 which optionally may carry a vibration absorbing knitted metal mesh bumper pad 306 on at least one extremity thereof which comes into contact with an interior surface of the conduit in the fully closed position of the valve. Valve assembly 302 is shown in phantom in its fully open position wherein the valve flap is substantially parallel to a longitudinal axis of the conduit. Such a valve assembly is substantially as disclosed in commonly assigned U.S. Pat. No. 7,434,570.

The steps in the method of assembly of the present teachings may be described in conjunction with the various steps depicted in FIGS. 4A-4F.

In the instant method, the valve plate may be fastened, for example, by welding to a valve axle independently of the assembly process of the valve to the conduit. This enables the flap/axle assembly to be welded outside the conduit in a well controlled independent fixture.

The method begins at FIG. 4A by selecting first and second conduit sections 102 and 104. Then at FIG. 4B, each conduit section is flared at 106 of conduit section 102 and at 108 of conduit section 104. Preferably these flares are on the order of 45°.

Figure 4C:
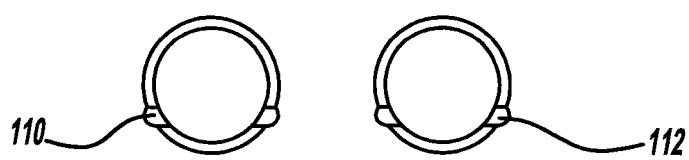

Next, as shown in FIG. 4C, first and second indentations are formed in the first and second conduit sections. Indentation pair 110 is shown formed in section 102 while indentation pair 112 is shown formed in section 104. Preferably, this forming operation forms the pair of indentations substantially simultaneously through use of a cylindrical ram tool. The indentation pairs are formed so as to align with each other when conduit sections 102 and 104 are placed in abutting relationship of their respective flared ends.

Figure 4D:
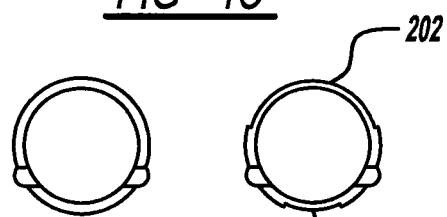

At the step illustrated in FIG. 4D, one of the conduit sections, for example, section 104, has notches taken out of the flared end 108 at the flange extending above the notches and below the notches. These notches are shown at 202 and 204.

Figure 4E:
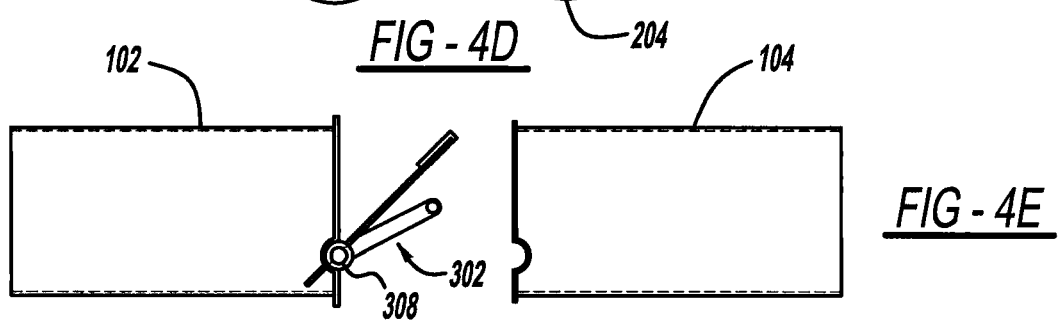

Next, as shown in FIG. 4E, a valve plate previously independently welded to a valve axle 308 and comprising assembly 302 is placed in the indentations 110 of conduit section 102.

Figure 4F:
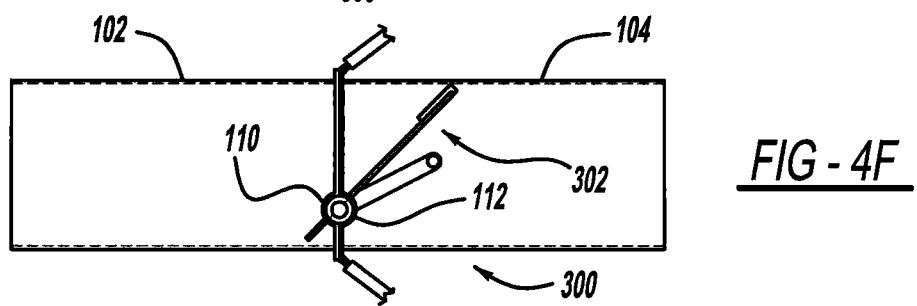

Finally, at FIG. 4F, section 102 is moved into abutting engagement with section 104 such that the indentations 110 and 112 surround axle 108 and any bushing that may have been placed thereon. Such bushings are preferably comprised of a knitted metal mesh. At the final step, sections 102 and 104 are welded at the notches.

By forming the flange and the indentation together, the result is a flanged opening that better supports the axle and its bushings for longer durability. As mentioned previously, the two-piece conduit approach allows the valve flap and axle to be welded outside the pipe in a well controlled fixture.

The foregoing description of the embodiments has been provided for purposes of illustration and example. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method of assembly of a rotatable flapper valve to an interior of a conduit, the method comprising:
   fastening a valve plate to a valve axle;
   selecting first and second conduit sections;
   flaring first ends of the first and second conduit sections;
   subsequently forming first and second indentations in the flared first end of the first conduit section, wherein the first and second indentations in the first conduit section are formed substantially simultaneously with a cylindrical ram;
   forming first and second indentations in the flared first end of the second conduit section such that they will align with the first and second indentations in the flared first end of the first conduit section;
   placing the valve axle in the first and second indentations in the flared first end of the first conduit section;
   placing the flared first end of the second conduit section in contact with the flared first end of the first conduit section such that the first and second indentations in the first flared end of the second conduit section align with the first and second indentations of the flared first end of the first conduit section to partially surround the valve axle; and
   fastening the first flared end of the first conduit section to the first flared end of the second conduit section.

2. The method of claim 1 further comprising placing first and second bushings on opposite ends of the valve axle prior to placing the valve axle in the first and second indentations of the first conduit section.

3. The method of claim 1 further comprising:
   prior to fastening the first conduit section to the second conduit section, forming a notch in the first flared end of one of the first and second conduit sections.

4. The method of claim 1 wherein the valve plate is fastened to the valve axle by welding.

5. The method of claim 1 wherein the first flared end of the first conduit section is fastened to the first flared end of the second conduit section by welding.

6. The method of claim 1 wherein the flaring of the first ends of the first and second conduit sections includes flaring to substantially 90°.

7. The method of claim 1 wherein the first and second indentations in the second conduit section are formed substantially simultaneously with a cylindrical ram.

8. The method of claim 5 further comprising:
prior to welding the first flared end of the first conduit section to the first flared end of the second conduit section, forming a notch in the first flared end of one of the first and second conduit sections.

9. The method of claim 1, wherein a rotational axis of the valve axle and the first and second indentations are offset from a longitudinal centerline of the first conduit section.

10. A method of assembly of a rotatable flapper valve to an interior of a conduit, the method comprising:
fastening a valve plate to a valve axle;
selecting first and second conduit sections;
flaring first ends of the first and second conduit sections;
forming first and second indentations in the flared first end of the first conduit section;
forming first and second indentations in the flared first end of the second conduit section such that they will align with the first and second indentations in the flared first end of the first conduit section;
placing the valve axle in the first and second indentations in the flared first end of the first conduit section;
placing the flared first end of the second conduit section in contact with the flared first end of the first conduit section such that the first and second indentations in the first flared end of the second conduit section align with the first and second indentations of the flared first end of the first conduit section to partially surround the valve axle;
fastening the first flared end of the first conduit section to the first flared end of the second conduit section;
forming a notch in only the first flared end of the first conduit section; and
welding the first flared end of the first conduit section to the first flared end of the second conduit section at the notch to penetrate the first flared end of the second conduit section.

11. The method of claim 1, wherein the notch is formed above a central axis of the first conduit section.

12. The method of claim 11, further including forming another notch in the first flared end of the first conduit section below the central axis of the first conduit section and welding the first flared end of the first conduit section to the first flared end of the second conduit section at the another notch.

* * * * *